(12) United States Patent
Lim

(10) Patent No.: US 9,507,398 B2
(45) Date of Patent: Nov. 29, 2016

(54) COMMUNICATION OVER IDENTIFICATION LINE

(71) Applicant: Infineon Technologies Austria AG, Villach (AT)

(72) Inventor: Cheow Guan Lim, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 205 days.

(21) Appl. No.: 14/194,056

(22) Filed: Feb. 28, 2014

(65) Prior Publication Data

US 2015/0248151 A1    Sep. 3, 2015

(51) Int. Cl.
*G06F 1/00* (2006.01)
*G06F 3/00* (2006.01)
*G06F 1/26* (2006.01)
*G06F 13/10* (2006.01)

(52) U.S. Cl.
CPC .............. *G06F 1/266* (2013.01); *G06F 13/10* (2013.01); *Y02B 60/1228* (2013.01)

(58) Field of Classification Search
CPC ..................................... G06F 1/3203
USPC ....................................... 713/310
See application file for complete search history.

(56) References Cited

U.S. PATENT DOCUMENTS

| | | | |
|---|---|---|---|
| 6,256,682 B1 | 7/2001 | Gudan et al. | |
| 7,356,715 B2 * | 4/2008 | Okayasu | 713/300 |
| 7,679,317 B2 | 3/2010 | Veselic | |
| 7,711,870 B2 * | 5/2010 | Yoshida et al. | 710/16 |
| 7,917,781 B2 | 3/2011 | Ho et al. | |
| 8,275,914 B2 * | 9/2012 | Kim et al. | 710/15 |
| 8,358,100 B2 | 1/2013 | Helfrich | |
| 8,539,266 B2 * | 9/2013 | Kawano | 713/300 |
| 8,876,816 B2 * | 11/2014 | Hosier | 606/34 |
| 8,898,363 B2 * | 11/2014 | Saarinen et al. | 710/305 |
| 8,918,549 B2 * | 12/2014 | Waters | 710/16 |
| 2014/0184469 A1 * | 7/2014 | Yoshino et al. | 343/906 |
| 2015/0249354 A1 | 9/2015 | Lim et al. | |

OTHER PUBLICATIONS

"Universal Serial Bus Power Delivery Specification," Intel Corporation, USB Power Delivery Specification Revision 1.0, Jan. 26, 2013, 328 pp.

* cited by examiner

*Primary Examiner* — Suresh Suryawanshi
(74) *Attorney, Agent, or Firm* — Shumaker & Sieffert, P.A.

(57) ABSTRACT

In one example a method includes communicating, by a first device, with a second device via an identification (ID) line of a universal serial bus (USB) cable. A first connector of the USB cable may be attached to a USB connector of the first device. A second connector of the USB cable may be attached to a USB connector of the second device. The USB connector of the first device may include a bus voltage ($V_{BUS}$) connector configured to mate with a $V_{BUS}$ line of the USB cable, a positive data (D+) connector configured to mate with a D+ line of the USB cable, a negative data (D−) connector configured to mate with a D− line of the USB cable, the ID connector configured to mate with a ID line of the USB cable, and a ground (GND) connector configured to mate with a GND line of the USB cable.

19 Claims, 7 Drawing Sheets

COMMUNICATION OVER IDENTIFICATION LINE

TECHNICAL FIELD

This disclosure relates to inter-device communication, and in particular, to inter-device communication over an identification line.

BACKGROUND

Universal serial bus (USB) has evolved from a data interface capable of supplying limited power to a primary provider of power with a data interface. Today, many devices charge or get their power from USB ports contained in laptops, cars, aircraft, or even wall sockets. USB has become a ubiquitous power socket for many small devices such as cell phones, MP3 players and other hand-held devices. USB may fulfill user requirements of data transfer, but may also to provide the ability to power or charge devices without the need to load a driver on the devices.

Over time, power requirements of USB devices have increased. One result of the increase in power requirements is an increase in charge time for devices which utilize USB ports to charge batteries.

SUMMARY

In general, the techniques described in this disclosure are related to using the identification (ID) line of a USB cable to enable inter-device communication. For example, a first device may communicate with a second device via an ID line of a USB cable.

In one example, a device includes a universal serial bus (USB) connector that includes a bus voltage ($V_{BUS}$) connector configured to mate with a $V_{BUS}$ line of a USB cable, a positive data (D+) connector configured to mate with a D+ line of the USB cable, a negative data (D−) connector configured to mate with a D− line of the USB cable, an identification (ID) connector configured to mate with a ID line of the USB cable, and a ground (GND) connector configured to mate with a GND line of the USB cable. In this example, the device also includes a communication module configured to communicate with another device via the ID line of the USB cable.

In another example, a method may be performed by a first device that comprises a universal serial bus (USB) connector that includes a bus voltage ($V_{BUS}$) connector configured to mate with a $V_{BUS}$ line of a USB cable, a positive data (D+) connector configured to mate with a D+ line of the USB cable, a negative data (D−) connector configured to mate with a D− line of the USB cable, an identification (ID) connector configured to mate with an ID line of the USB cable, and a ground (GND) connector configured to mate with a GND line of the USB cable. In this example, the method includes communicating, by the first device, with a second device via the ID line of the USB cable, wherein a first connector of the USB cable is attached to the USB connector of the first device, and wherein a second connector of the USB cable is attached to a USB connector of the second device.

In another example, a USB cable includes a $V_{BUS}$ line; a D+ line; a D− line; an ID line; and a GND line. In this example, the USB cable also includes an A-type connector that includes: a $V_{BUS}$ connector configured to mate with a first end of the $V_{BUS}$ line; a D+ connector configured to mate with a first end of the D+ line; a D− connector configured to mate with a first end of the D− line; an ID connector configured to mate with a first end of the ID line; and a GND connector configured to mate with a first end of the GND. In this example, the USB cable also includes a B-type connector that includes: a $V_{BUS}$ connector configured to mate with a second end of the $V_{BUS}$ line; a D+ connector configured to mate with a second end of the D+ line; a D− connector configured to mate with a second end of the D− line; an ID connector configured to mate with a second end of the ID line; and a GND connector configured to mate with a second end of the GND. In this example, the USB cable also includes a capacitor electrically positioned between the first ID connector and the second ID connector.

In another example, a system includes a USB cable that includes: a $V_{BUS}$ line; a D+ line; a D− line; an ID line; and a GND line. In this example, the USB cable also includes a first connector that includes: a first $V_{BUS}$ connector connected to a first end of the $V_{BUS}$ line; a first D+ connector connected to the first end of the D+ line; a first D− connector connected to the first end of the D− line; a first ID connector connected to the first end of the ID line; and a first GND connector connected to the first end of the GND line. In this example, the USB cable also includes a second connector that includes: a second $V_{BUS}$ connector connected to a second end of the $V_{BUS}$ line; a second D+ connector connected to the second end of the D+ line; a second D− connector connected to the second end of the D− line; a second ID connector connected to the second end of the ID line; and a second GND connector connected to the second end of the GND line. In this example, the USB cable also includes a capacitor electrically positioned between the first ID connector and the second ID connector. In this example, the system also includes a first device that includes: a USB connector that includes: a $V_{BUS}$ connector configured to mate with the first $V_{BUS}$ connector of the USB cable; a D+ connector configured to mate with the first D+ connector of the USB cable; a D− connector configured to mate with the first D− connector of the USB cable; a ID connector configured to mate with the first ID connector of the USB cable; and a GND connector configured to mate with the first GND connector of the USB cable. In this example, the first device also includes a communication module. In this example, the system also includes a second device that includes a USB connector that includes: a $V_{BUS}$ connector configured to mate with the second $V_{BUS}$ connector of the USB cable; a D+ connector configured to mate with the second D+ connector of the USB cable; a D− connector configured to mate with the second D− connector of the USB cable; a ID connector configured to mate with the second ID connector of the USB cable; and a GND connector configured to mate with the second GND connector of the USB cable. In this example, the second device also includes a second communication module. In this example, the first communication module and the second communication module are configured to communicate with each other by exchanging data over the ID line of the USB cable.

The details of one or more examples are set forth in the accompanying drawings and the description below. Other features, objects, and advantages of the features described herein will be apparent from the description and drawings, and from the claims.

DETAILED DESCRIPTION

Modern devices utilize universal serial bus (USB) connections for both data interface and power exchange. As the requirements of modern devices have increased, more and more inter-device bandwidth is needed. However, direct use of the other data lines (i.e., positive data line D+ and negative data line D−) for certain communications may not be desirable.

Techniques according to this disclosure may enable communication between USB devices via an identification (ID) connector. In some examples, a first device may communicate with a second device via an ID line of a USB cable. In this way, additional communication bandwidth may be created between the first device and the second device without interfering with the other data lines.

Additionally, the power provided over a standard USB connection is typically limited to 5V with a current limit of 2.5A which yields approximately 15 W. However, in order to accommodate their increasing power demands, ever higher capacity batteries are being used to power mobile devices. For example, batteries having capacities of 5600 mAh to 10000 mAh are commonly found in modern mobile devices. The increase in battery capacity comes with a corresponding increase in the amount of time required to charge the battery. For examples, with a standard USB connection (i.e., 15 W) the charging time for a 5600 mAh battery is approximately 90 minutes and the charge time for a 10000 mAh battery is approximately 165 minutes.

Techniques according to this disclosure may enable two devices connected by a USB cable to negotiate various power characteristics of the connection via an ID line of the USB cable. In some examples, the devices could negotiate the amount of power supplied over the connection. For instance, a power consuming device may communicate with a power providing device via the ID line to request additional power. In this way, the amount of time required to charge a battery of the power consuming device may be reduced. Additionally, this may enable the power consuming device to operate at a higher power level.

As used in this disclosure, USB may refer to one of more USB specifications. Some example USB specifications include USB 1.0, USB 1.1, USB 2.0, USB 3.0, USB 3.1, and USB Power Delivery (PD) 1.0. Future USB specifications will likely emerge.

Figure 1:
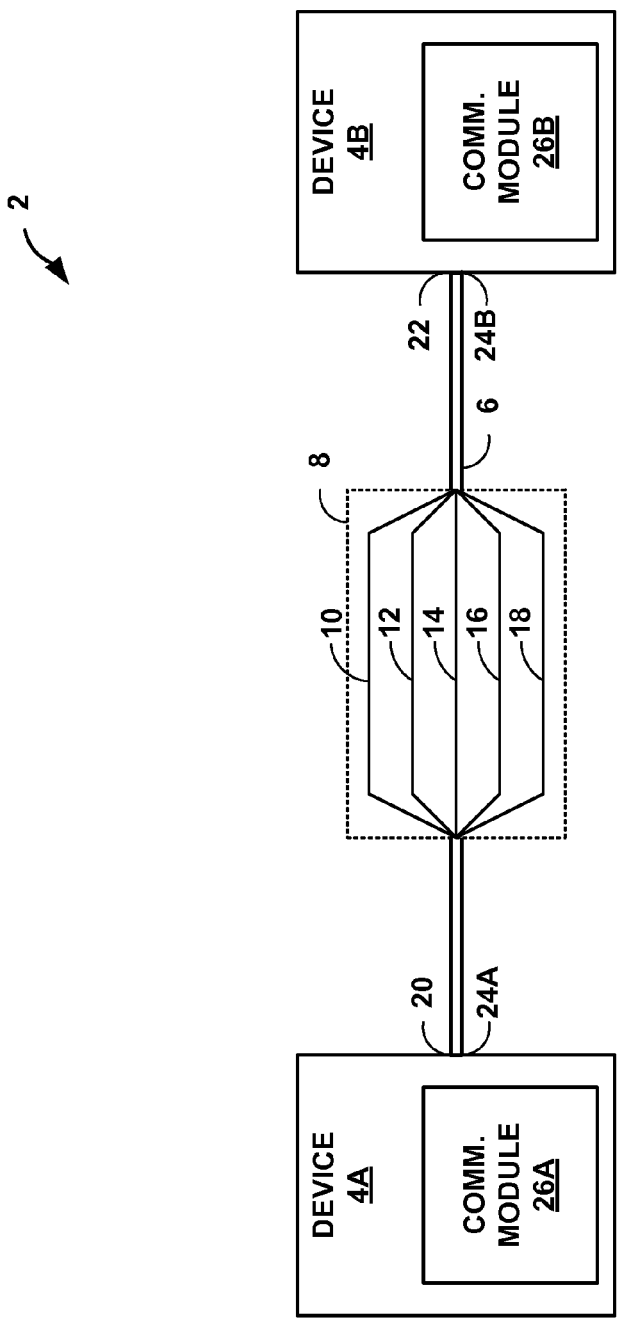
FIG. 1 is a block diagram illustrating an example system for inter-device communication over an identification line, in accordance with one or more aspects of the present disclosure.

FIG. 1 is a block diagram illustrating a system 2 for inter-device communication over an identification line, in accordance with one or more aspects of the present disclosure. System 2 includes devices 4A and 4B (collectively, "devices 4"), and USB cable 6.

USB cable 6 may be configured to connect device 4A to device 4B. As illustrated in conceptual block 8 of FIG. 1, USB cable 6 may include bus voltage ($V_{BUS}$) line 10, positive data (D+) line 12, negative data (D−) line 14, identification (ID) line 16, and ground (GND) line 18. USB cable 6 may include first USB connector 20 and second USB connector 22. First USB connector 20 and second USB connector 22 may each include a $V_{BUS}$ connector configured to mate with $V_{BUS}$ line 10 of USB cable 6, a D+ connector configured to mate with D+ 12 line of USB cable 6, a D− connector configured to mate with D− line 14 of USB cable 6, an ID connector configured to mate with ID line 16 of USB cable 6, and a GND connector configured to mate with GND line 18 of USB cable 6.

In some examples, devices 4 may be USB devices. As illustrated in FIG. 1, each of devices 4 may include a USB connector and a communication module. In the example of FIG. 1, device 4A includes USB connector 24A and communication module 26A, and device 4A includes USB connector 24B and communication module 26B (collectively, "USB connectors 24" and "communication modules 26"). In some examples, each of USB connectors 24 may include a $V_{BUS}$ connector configured to mate with a $V_{BUS}$ connector of USB cable 6, a D+ connector configured to mate a D+ connector of USB cable 6, a D− connector configured to mate a D− connector of USB cable 6, an ID connector configured to mate with an ID connector of USB cable 6, and a GND connector configured to mate with a GND connector of USB cable 6. In some examples, each of USB connectors 24 may be a standard, a "mini, or a micro connector in accordance with one or more USB specifications. In some examples, each of USB connectors 24 may be an A-type connector or a B-type connector in accordance with one or more USB specifications. In some examples, each of USB connectors 24 may be a plug or a receptacle in accordance with one or more USB specifications. Examples of devices 4 may include, but are not limited to desktop computers, laptop computers, mobile computing devices, cars, aircraft, wall sockets, cell phones, portable music players, and other devices.

In accordance with one or more techniques of this disclosure, device 4A may be configured to communicate with device 4B via ID line 16 of USB cable 6. For example, first connector 20 of USB cable 6 may be attached to USB connector 24A of device 4A, second connector 22 of USB cable 6 may be attached to USB connector 24B of device 4B, and communication module 26A may be configured to exchange data with communication module 26B over ID line 16 of USB cable 6. In this way, device 4A may communicate with device 4B without interfering with the other data lines (i.e., D+ line 12 and D− line 14).

In some examples, a first device of devices 4 may operate as a power provider and a second device of devices 4 may operate as a power consumer. In other words, a first device of devices 4 may provide power to a second device of devices 4. In the example of FIG. 1, device 4A may operate as a power provider and device 4B may operate as a power consumer. For example, where device 4B includes a mobile device with a battery and device 4A includes a laptop computer, device 4B may operate as a power consumer in order to operate and/or charge the battery. In some examples, a device of devices 4 may be configured to transition between operation as a power provider and operation as a power consumer. For instance, a first device of devices 4 may initially operate as a power provider (i.e., providing power to a second device of devices 4) and may then transition to operation as a power consumer (i.e., consuming power provided by the second device). For example, as described above, where device 4B includes a mobile device with a battery and device 4A includes a laptop computer, device 4B may initially operate as a power consumer in order to operate and/or charge the battery. However, a state may be reached where device 4A requires power. In such a state, device 4B may be configured to transition from operating as a power consumer to operating as a power provider. In other words, the battery of device 4B may be used to provide power to former power provider, device 4A.

In some examples, device 4A may be configured to negotiate one or more power characteristics for the $V_{BUS}$ line with device 4B. For example, communication module 26A may be configured to negotiate one or more of a voltage level for the $V_{BUS}$ line and/or a current level for the $V_{BUS}$ line with communication module 26B of device 4B. In some examples, such as where device 4B is operating as a power consumer, device 4B may require additional power from device 4A. In such examples, device 4B may be configured to send a request, via ID line 16 of USB cable 6, to device 4A for additional power. For instance, device 4B may send a message to device 4A requesting that the voltage level for the $V_{BUS}$ line be changed to a higher level (e.g., from 5V to 12V).

Figure 2:
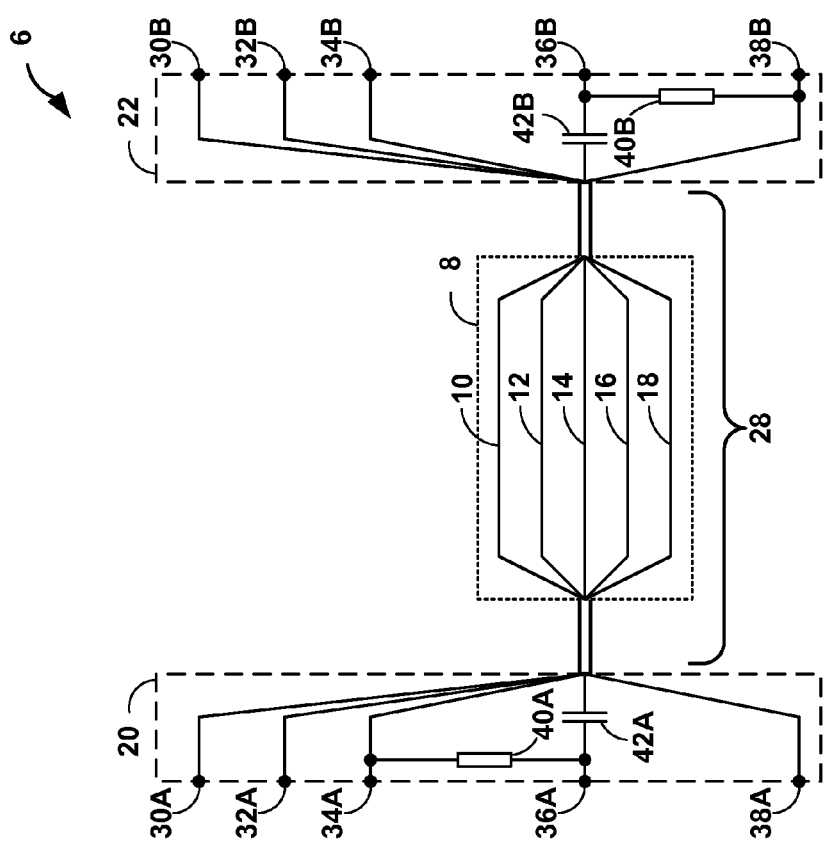
FIG. 2 is a block diagram illustrating details of an example universal serial bus (USB) cable for inter-device communication over an identification line, in accordance with one or more aspects of the present disclosure.

FIG. 2 is a block diagram illustrating details of an example universal serial bus (USB) cable 6 for inter-device communication over an identification line, in accordance with one or more aspects of the present disclosure. As illustrated in the example of FIG. 2, USB cable 6 may include first connector 20, second connector 22, and cable portion 28.

As illustrated in conceptual block 8 of FIG. 2, cable portion 28 may include bus voltage ($V_{BUS}$) line 10, positive data (D+) line 12, negative data (D−) line 14, identification (ID) line 16, and ground (GND) line 18. In some examples, cable portion 28 may include additional lines. For instance, cable portion 28 may include one or more additional differential line pairs and/or a shield. In some examples, cable portion 28 may be up to 5 meters in length.

First connector 20, in some examples, may include D+ connector 30A, D− connector 32A, $V_{BUS}$ connector 34A, ID connector 36A, and GND connector 38A. Each of connectors 30A-38A may be connected to the corresponding line of cable portion 28. For instance, ID connector 36A may be connected to ID line 16. In some examples, first connector 20 may include one or more components configured to identify whether first connector 20 is an A-type connector or a B-type connector. For instance, first connector 20 may include resistor 40A which may be configured to pull the voltage level of ID connector 36A up to the voltage level of $V_{BUS}$ connector 30A. In some examples, first connector 20 may include a sixth connector. In some examples, resistor 40A may be connected across ID connector 36A and the sixth connector. In some examples, resistor 40A may be floating. In some examples, such as where resistor 40A is floating, resistor 40A may be pulled down by an additional resistor. In some examples, the additional resistor may have a resistance greater than a threshold (e.g., 220KΩ). In some examples, the additional resistor may pull resistor 40A down to the voltage level of GND connector 38A. In some examples, first connector 20 may include capacitor 42A configured to provide voltage isolation for $V_{BUS}$ line 10 during communication over ID line 16. In some examples, first connector 20 may include a low pass filter between resistor 40A and capacitor 42A. In such examples, the low pass filter may reduce switching noise.

Second connector 22, in some examples, may include D+ connector 30B, D− connector 32B, $V_{BUS}$ connector 34A, ID connector 36B, and GND connector 38B. Each of connectors 30B-38B may be connected to the corresponding line of cable portion 28. For instance, ID connector 36B may be connected to ID line 16. In some examples, second connector 22 may include one or more components configured to identify whether second connector 22 is an A-type connector or a B-type connector. For instance, second connector 22 may include resistor 40B which may be configured to pull the voltage level of ID connector 36B down to the voltage level of GND connector 38B. In some examples, second connector 22 may include capacitor 42B configured to provide voltage isolation for $V_{BUS}$ line 10 during communication over ID line 16. In some examples, second connector 22 may include a low pass filter between resistor 40B and capacitor 42B. In such examples, the low pass filter may reduce switching noise.

In some examples, either of first connector 20 and second connector 22 may comprise a standard, mini, or micro connector in accordance with one or more USB specifications. In some examples, either of first connector 20 and second connector 22 may comprise an A-type connector or a B-type connector in accordance with one or more USB specifications. In the example of FIG. 2, first connector 20 may be an A-type connector and second connector 22 may be a B-type connector. In some examples, either of first connector 20 and second connector 22 may comprise a plug or a receptacle in accordance with one or more USB specifications.

Figure 3:
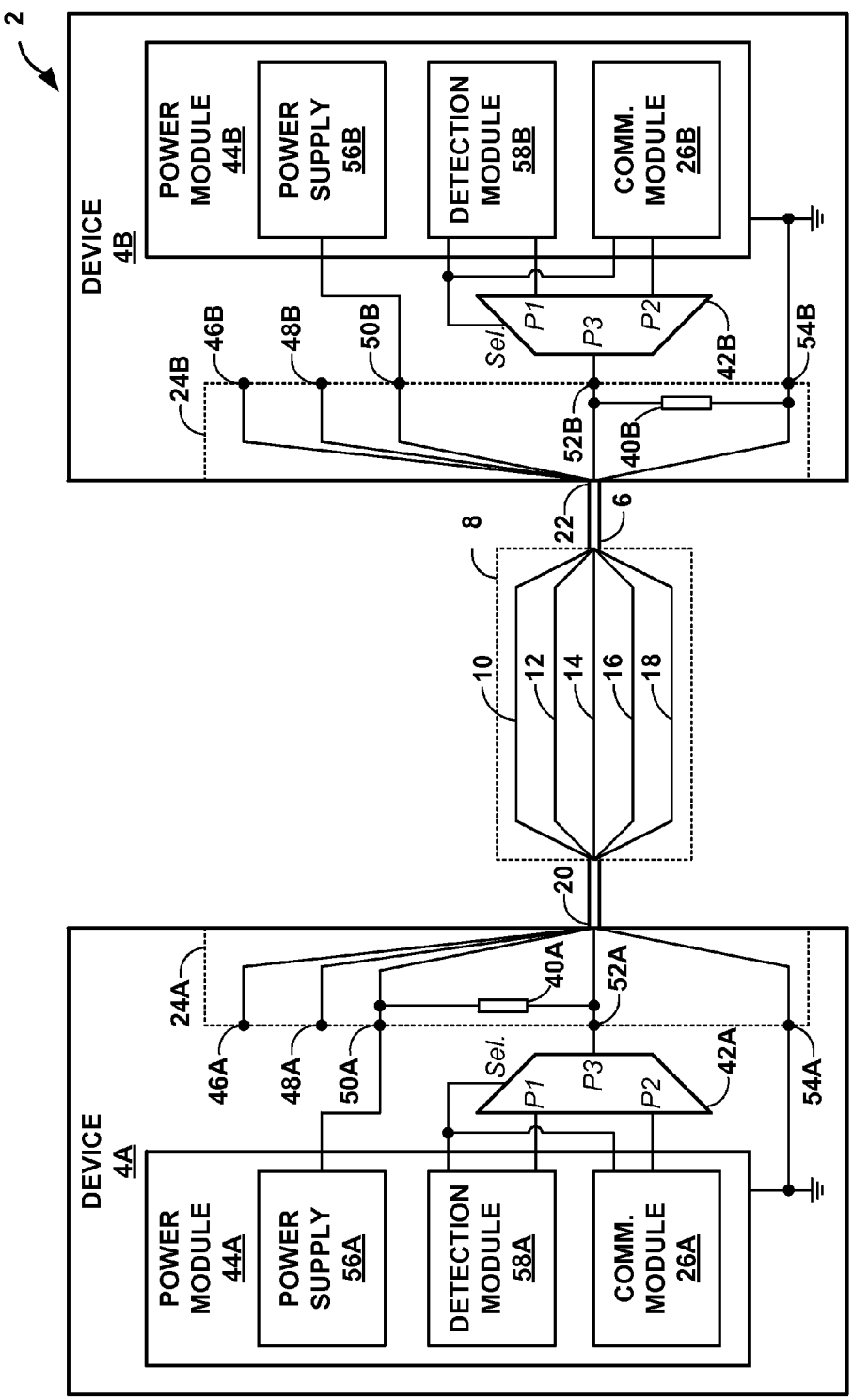
FIG. 3 is a block diagram illustrating details of an example system for inter-device communication over an identification line, in accordance with one or more aspects of the present disclosure.

FIG. 3 is a block diagram illustrating details of an example system for inter-device communication over an identification line, in accordance with one or more aspects of the present disclosure. As illustrated in the example of FIG. 3, system 2 may include device 4A, device 4B (collectively, "devices 4"), and USB cable 6. In some examples, each of devices 4 may include a USB connector, a multiplexor, and a power module. As illustrated in the example of FIG. 3, device 4A may include USB connector 24A, multiplexor 42A, and power module 44A, and device 4B may include USB connector 24B, multiplexor 42B, and power module 44B (collectively, "USB connectors 24," "multiplexors 42," and "power modules 44"). Each of USB connectors 24 may include a $V_{BUS}$ connector, a D+ connector, a D− connector, an ID connector, and a GND connector. As illustrated in the example of FIG. 3, USB connector 24A may include D+ connector 46A, D− connector 48A, $V_{BUS}$ connector 50A, ID connector 52A, and GND connector 54A, and USB connector 24B may include D+ connector 46B, D− connector 48B, $V_{BUS}$ connector 50B, ID connector 52B, and GND connector 52B (collectively, "D+ connectors 46," "D− connectors 48," "$V_{BUS}$ connectors 50," "ID connectors 52," and "GND connectors 54"). Each of the connectors included in each of connectors 24 may be configured to mate with a corresponding connector included in a connector of USB cable 6. For instance, ID connector 52A of connector 24A may be configured to mate with an ID connector of first end 20 of USB cable 6. Each of power modules 44 may include a power supply, a detection module, and a communication module. As illustrated in the example of FIG. 3, power module 44A may include power supply 56A, detection module 58A, and communication module 26A, and power module 44B may include power supply 56B, detection module 58B, and communication module 26B (collectively, "power supplies 56," "detection modules 58," and "communication modules 26").

As discussed above with reference to FIG. 1 and FIG. 2, USB cable 6 may be configured to connect device 4A to device 4B. USB cable 6 may include first connector 20 and second connector 22. Additionally, as illustrated in conceptual block 8, USB cable 6 includes bus voltage ($V_{BUS}$) line 10, positive data (D+) line 12, negative data (D−) line 14, identification (ID) line 16, and ground (GND) line 18. In some examples, first end 20 of USB cable 6 may include identification resistor 40A. In some examples, second end 22 of USB cable 6 may include identification resistor 40B.

Power supplies 56 may be configured to provide power to other devices and/or components. In some examples, a first power supply of power supplies 56 may be configured to provide power to a second power supply of power supplies 56 via $V_{BUS}$ line 10. In some examples, such as where a first power supply of power supplies 56 is receiving power, the first power supply may be configured to provide power to one or more other components. For instance, power supply 56B may be configured to receive power from power supply 56A and utilize the received power to charge a battery coupled to device 4B.

Multiplexors 42 may be configured to selectively connect one of a plurality of ports (i.e., P1 and P2) with another port (i.e., P3) based on a selector signal (Sel.). In some examples, a communication module and a detection module may be connected to the plurality of ports of a multiplexor and the other port of the multiplexor may be connected to an ID connector. For instance, detection module 58A and communication module 26A may be connected to the ports of multiplexor 42A. In some examples, either or both a communication module and a detection module may be configured to output the selection signal to a multiplexor. For instance, either or both of detection module 58A and communication module 26A may be configured to output a selection signal to multiplexor 42A. In this way, a multiplexor may enable a detection module and a communication module to alternatively connect to an ID connector.

Identification resistors 40 may be configured to identify whether a connector of USB cable 6 is an A-type connector or a B-type connector in accordance with one or more USB specifications. For example, A-type connectors may include an identification resistor electrically positioned between the ID connector and the $V_{BUS}$ connector. In the example of FIG. 3, connector 20 is an A-type connector because identification resistor 40A is illustrated as electrically connecting the ID connector of connector 20 to the $V_{BUS}$ connector of connector 20. As another example, B-type connectors may include an identification resistor electrically positioned between the ID connector and the GND connector. In the example of FIG. 3, connector 22 is a B-type connector because identification resistor 40B is illustrated as electrically connecting the ID connector of connector 22 to the GND connector of connector 22.

In some examples, detection modules 58 may be configured to determine whether a connector of a USB cable attached to the USB connector of their respective device is an A-type connector or a B-type connector. For instance, detection module 58A may be configured to determine whether connector 20 of USB cable 6 is an A-type connector or a B-type connector and detection module 58B may be configured to determine whether connector 22 of USB cable 6 is an A-type connector or a B-type connector. In some examples, the detection modules 58 may be configured to determine the connector type based on a voltage level of ID connector 52. For instance, detection modules 58 may be determine that a connector is an A-type connector where the voltage level of respective ID connector 52 is pulled up (e.g., to the voltage level of respective $V_{BUS}$ connector 50). In some examples, detection modules 58 may be determine that a connector is an A-type connector where a resistance between respective ID connector 52 and respective GND connector 54 is greater than a threshold. In some examples, the threshold may be 220KΩ. Additionally, detection modules 58 may be determine that a connector is a B-type connector where the voltage level of respective ID connector 52 is pulled down to the voltage level of respective GND connector 54.

As discussed above with reference to FIG. 1, communication modules 26 may be configured to communication with each other over ID line 16 of USB cable 6. In some examples, the communication modules 26 may interface with one or more other components of their respective power modules 44. As one example, communication module 26A may configure one or more variables of power supply 56A, such as a voltage level and/or a current level. For instance, communication module 56A may configure a voltage set point that controls the voltage level power supply 56A outputs to $V_{BUS}$ connector 50A.

In accordance with one or more techniques of this disclosure, device 4A may be connected to device 4B via USB cable 6. In the example of FIG. 3, connector 20 of USB cable 6 may be coupled with connector 24A of device 4A and connector 22 of USB cable 6 may be coupled with connector 24B of device 4B.

In some examples, when devices 4 are first connected, devices 4 may undergo a cable connect phase. During the cable connect phase, detection module 58A may output a selection signal to multiplexor 42A that causes multiplexor 42A to connect detection module 58A with ID connector 52A. While connected to ID connector 52A, detection module 58A may determine whether connector 20 is an A-type connector or a B-type connector. In some examples, detection module 58A may base the determination on a voltage level of ID connector 52A. In the example of FIG. 3, detection module 58A may determine that connector 20 is an A-type connector because identification resistor 40A may pull the voltage level of ID connector 52A up to the voltage level of $V_{BUS}$ connector 50A. In some examples, after determining the type of connector 20, detection module 58A may output a selection signal that causes multiplexor 42A to connect communication module 26A to ID connector 52A. In some examples, after determining the type of connector 20, detection module 58A may output a message to communication module 26A that indicates the type of connector 20. In some examples, in response to receiving the message indicating the type of connector 20, communication module 26A may output a selection signal that causes multiplexor 42A to connect communication module 26A to ID connector 52A. Following the cable connect phase, device 4A may enter a standard operating phase.

During the cable connect phase, detection module 58B may perform operations similar to detection module 58A. For instance, detection module 58B may determine whether connector 22 is an A-type connector of a B-type connector. In the example of FIG. 3, detection module 58B may determine that connector 22 is a B-type connector because identification resistor 40B may pull the voltage level of ID connector 52B down to the voltage level of GND connector 54B. In some examples, after determining the type of connector 22, detection module 58B may output a selection signal that causes multiplexor 42B to connect communication module 26B to ID connector 52B. In some examples, after determining the type of connector 22, detection module 58B may output a signal to communication module 26B that indicates the type of connector 22. In some examples, in response to receiving the message indicating the type of connector 22, communication module 26B may output a selection signal that causes multiplexor 42B to connect communication module 26B to ID connector 52B. Following the cable connect phase, device 4B may enter a standard operating phase.

During the standard operating phase, communication module 26A may utilize ID line 16 of USB cable 6 to communicate with communication module 26B. In this way, as opposed to communicating over D+ line 12 and D− line 14, device 4 may communicate with device 4B over ID line 16. In some examples, communication modules 26 may communicate using small-signal communication. For instance, communication modules 26 may use single wire time-based communication. The single wire time-based communication may be similar to the communication in the MIPI BIF physical and link layer. In some examples, the communication between communication modules 26 may include one or more authentication operations.

Figure 4:
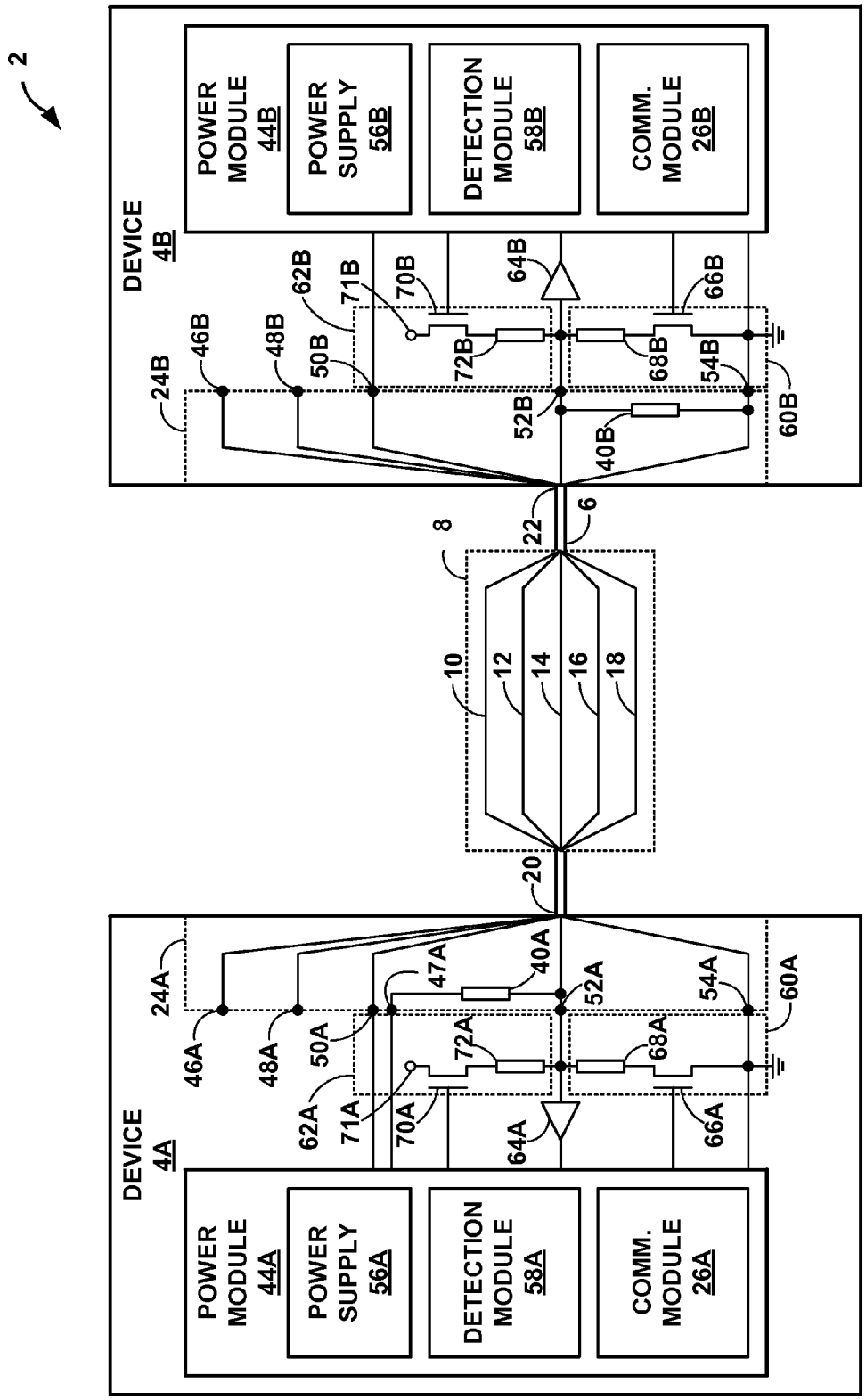
FIG. 4 is a block diagram illustrating details of an example system for inter-device communication over an identification line, in accordance with one or more aspects of the present disclosure.

FIG. 4 is a block diagram illustrating details of an example system for inter-device communication over an identification line, in accordance with one or more aspects of the present disclosure. As illustrated in the example of FIG. 3, system 2 may include device 4A, device 4B (collectively, "devices 4"), and USB cable 6. In some examples, each of devices 4 may include a USB connector, a power module, a first transmitter, a second transmitter, and a buffer. As illustrated in the example of FIG. 4, device 4A may include USB connector 24A, power module 44A, first transmitter 60A, second transmitter 62A, and buffer 64A, and device 4B may include USB connector 24B, power module 44B, first transmitter 60B, second transmitter 62B, and buffer 64B (collectively, "USB connectors 24," "power modules 44," "first transmitters 60," "second transmitters 62," and "buffers 64"). As discussed above with reference to FIG. 3, each of USB connectors 24 may include a $V_{BUS}$ connector, a D+ connector, a D− connector, an ID connector, and a GND connector. Each of the connectors included in each of connectors 24 may be configured to mate with a corresponding connector included in a connector of USB cable 6. Also, as discussed above with reference to FIG. 3, each of power modules 44 may include a power supply, a detection module, and a communication module. Additionally, as illustrated in the example of FIG. 4, each of USB connectors 24 may include a sixth connector (sixth connector 47A and sixth connector 47B, collectively, "sixth connectors 47"). In some examples, sixth connectors 47 may be connected to one or more components of their respective devices. For instance, sixth connector 47A may be connected to power module 44A (e.g., detection module 58A of power module 44A). In some examples, power modules 44 may output a constant voltage (which, in some examples, may be an initial voltage of $V_{BUS}$ line 10) on their respective sixth connectors 47. For instance, power module 44A may output 5V on sixth connector 47A.

As discussed above with reference to FIGS. 1-3, USB cable 6 may be configured to connect device 4A to device 4B. USB cable 6 may include first connector 20 and second connector 22. Additionally, as illustrated in conceptual block 8, USB cable 6 includes bus voltage ($V_{BUS}$) line 10, positive data (D+) line 12, negative data (D−) line 14, identification (ID) line 16, and ground (GND) line 18. In some examples, first end 20 of USB cable 6 may include identification resistor 40A. In some examples, second end 22 of USB cable 6 may include identification resistor 40B.

As discussed above with reference to FIG. 3, power supplies 56 may be configured to provide power to other devices and/or components. For instance, power supply 56A may be configured to provide power to device 4B via $V_{BUS}$ line 10. Additionally, power supply 56B may be configured to provide power to a battery connected to device 4B. In other words, power supply 56B may be configured to charge a battery.

In some examples, first transmitters 60 may be configured to receive a signal from a power module and output a corresponding signal onto ID line 16 of USB cable 6. For instance, first transmitter 60A may be configured to output a signal onto ID line 16 in response to receiving a signal from power module 44A. Each of first transmitters 60 may include a transistor and a resistor. As shown in the example of FIG. 4, first transmitter 60A may include transistor 66A and resistor 68A, and first transmitter 60B may include transistor 66B and resistor 68B (collectively, "transistors 66" and "resistors 68"). In some examples, each first transmitter may be positioned between an ID connector and a GND connector. For instance, first transmitter 60A may be electrically positioned between ID connector 52A and GND connector 54A and first transmitter 60B may be electrically positioned between ID connector 52B and GND connector 54B.

In some examples, second transmitters 62 may be configured to receive a signal from a power module and output a corresponding signal onto ID line 16 of USB cable 6. For instance, second transmitter 62A may be configured to output a signal onto ID line 16 in response to receiving a signal from power module 44A. Each of second transmitters 62 may include a transistor and a resistor. As shown in the example of FIG. 4, second transmitter 62A may include transistor 70A, power supply 71A, and resistor 72A, and second transmitter 62B may include transistor 70B, power supply 71B, and resistor 72B (collectively, "transistors 70," "power supplies 71," and "resistors 72"). In some examples, each second transmitter may be positioned between an ID connector and a $V_{BUS}$ connector. For instance, second transmitter 62A may be electrically positioned between ID connector 52A and $V_{BUS}$ connector 50A and second transmitter 60B may be electrically positioned between ID connector 52B and $V_{BUS}$ connector 50B. In some examples, each second transmitter may be positioned between an ID connector and a power supply. For instance, second transmitter 62A may be electrically positioned between ID connector 52A and power supply 71A and second transmitter 60B may be electrically positioned between ID connector 52B and power supply 71B. In some examples, power supplies 71 may output power at the same voltage as the voltage level of $V_{BUS}$ line 10. In some examples, power supplies 71 may output power at a different voltage than the voltage level of $V_{BUS}$ line 10. For instance, power supplies 71 may output power at a lower voltage than the voltage level of $V_{BUS}$ line 10 when the voltage level of $V_{BUS}$ line 10 is greater than a threshold, which may be an initial voltage level of $V_{BUS}$ line 10 (e.g., 5V).

In some examples, the values of resistors 68 and resistors 72 may be selected with different orders of magnitude. In this way, devices 4 may communicate over ID line 16 in full duplex. In other words, by selecting the values of resistors 68 and resistors 72 in different orders of magnitude, devices 4 may both simultaneously transmit and receive information over ID line 16.

Buffers 64 may be configured to couple an ID connector to a power module. For instance, buffer 64A may be configured to couple ID connector 52A to power module 44A. In some examples, one or more of buffers 64 may include one or more of a buffer amplifier, a comparator, and/or a filter.

Device 4A may be providing power to device 4B via $V_{BUS}$ line 10 of USB cable 6. Device 4B may be using the provided power to operate and/or charge a battery. For instance, power supply 56A may be outputting 5V on to $V_{BUS}$ line 10 with a current limit of 2.5A and power supply 56B may be using the provided power to charge a battery. In accordance with one or more techniques of this disclosure, device 4B may request that device 4A provide additional power to, e.g., reduce the time required to charge the battery. To make the request, communication module 26B may communicate with communication module 26A via ID line 16 of USB cable 6 to negotiate a higher voltage and/or current level. For instance, communication module 26B may output a signal to the appropriate transmitter that causes the transmitter to output a signal onto ID line 16. In the example of FIG. 4, because second connector 22 is a B-type connector, communication module 26B may cause second transmitter 62B to output a signal onto ID line 16. The signal may include a request that device 4A provide additional power. In some examples, the request may be for a specific voltage level and/or current level (e.g., 12V with a current limit of 2.5A). In some examples, the request may simply be a request for a higher level. In some examples, the signal may be a request for less power. In some examples, after sending the request for additional power, device 4B may be configured to reduce the amount of current it draws from device 4A. In some examples, device 4B may be configured to reduce the amount of current drawn from device 4A to zero. In this way, device 4B may enable device 4A to more easily change a voltage level and/or a current level.

Device 4A may receive the signal from device 4B. For instance, buffer 64A may receive the signal from ID line 16 and provide a representation of the signal to communication module 26A. Communication module 26A may receive the representation of the signal and determine whether power supply 56A is capable of providing the requested level of power. If power supply 56A is capable of providing the requested level of power, communication module 26A may cause power supply 56A to output the request level of power onto $V_{BUS}$ line 10 (e.g., 12V with a current limit of 2.5A). In some examples, communication module 26A may send a response to communication module 26B. Communication module 26A may communicate with communication module 26B by outputting a signal to the appropriate transmitter that causes the transmitter to output a signal onto ID line 16. In the example of FIG. 4, because second connector 20 is an A-type connector, communication module 26A may cause first transmitter 60A to output a signal onto ID line 16. The signal may include one or more of an acknowledgement of the request, an acceptance of the request, a denial of the request, or an alternate proposal (e.g., a different voltage level and/or current level).

Device 4B may receive the signal from device 4A. For instance, buffer 64B may receive the signal from ID line 16 and provide a representation of the signal to communication module 26B. In this way, devices 4 may negotiate one or more power characteristics for $V_{BUS}$ line 10. Also, in this way, device 4B may reduce the time required to charge a battery.

Figure 5:
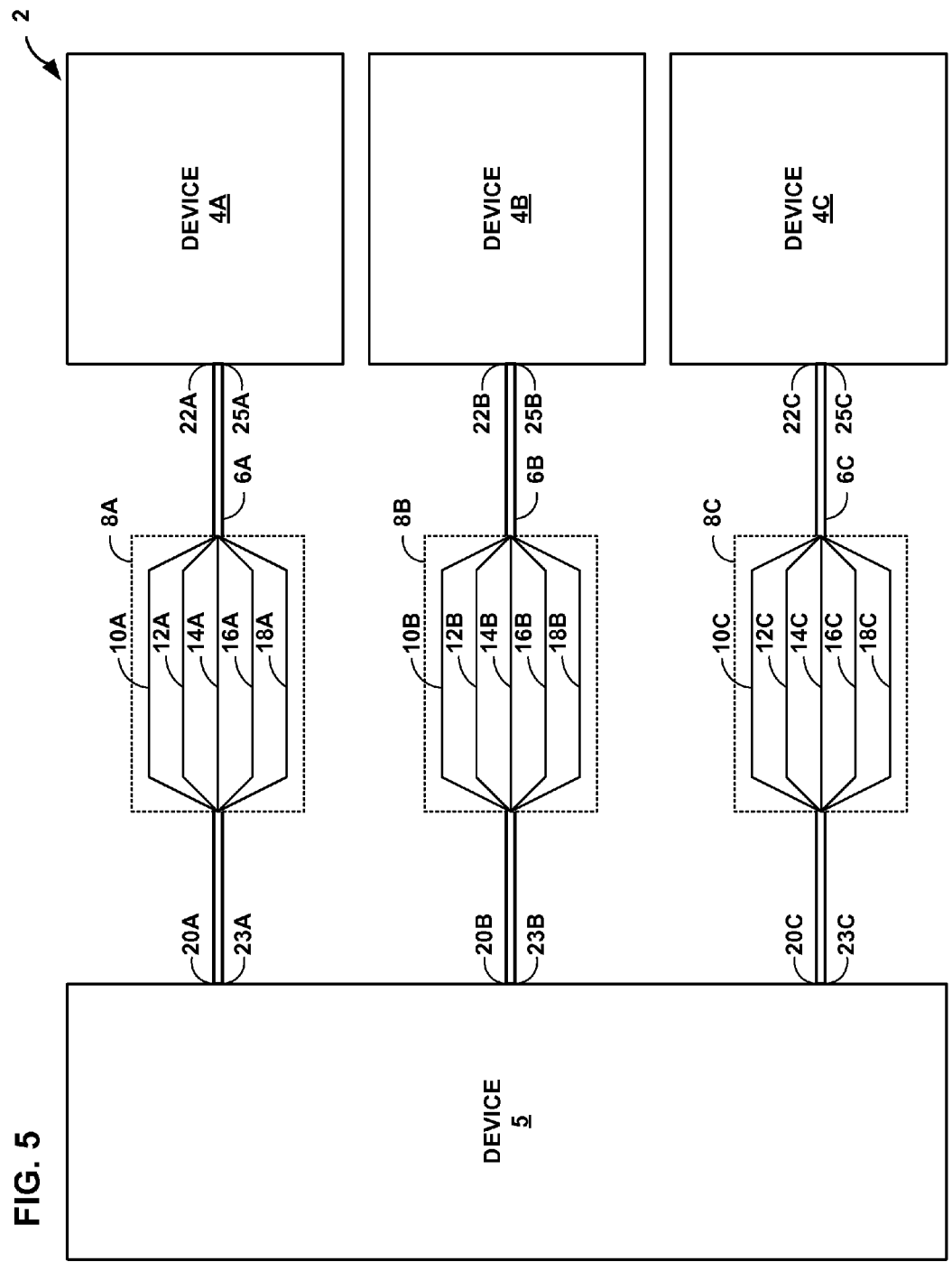
FIG. 5 is a block diagram illustrating details of an example system for inter-device communication over an identification line, in accordance with one or more aspects of the present disclosure.

FIG. 5 is a block diagram illustrating details of an example system for inter-device communication over an identification line, in accordance with one or more aspects of the present disclosure. As illustrated in FIG. 5, system 2 may include device 4A, device 4B, device 4C (collectively, "devices 4"), device 5, and USB cables 6A-6C (collectively, "USB cables 6").

In some examples, device 4A may be similar to device 4A of FIGS. 1-4. For instance, device 4A may be configured to communicate with another device via the ID line of a USB cable. In some examples, device 4B and device 4C may be similar to device 4B of FIGS. 1-4. For instance, device 4B and device 4C may be configured to communicate with another device via the ID line of a USB cable.

USB cable 6A may be configured to connect device 4A to device 5, USB cable 6B may be configured to connect device 4B to device 5, and USB cable 6C may be configured to connect device 4C to device 5. Each of USB cables 6 may be similar to USB cable 6 of FIGS. 1-4. For instance, as illustrated in their respective conceptual blocks 8A-8C, each of USB cables 6 may include a $V_{BUS}$ line (i.e., respectively, $V_{BUS}$ lines 10A-10C), a D+ line (i.e., respectively, D+ lines 12A-12C), a D− line (i.e., respectively, D− lines 14A-14C), an ID line (i.e., respectively, ID lines 16A-16C), and a GND line (i.e., respectively, lines 18A-18C). Additionally, each of USB cables 6 may include a first connector (i.e., respectively, first connectors 20A-20C) and a second connector (i.e., respectively, second connectors 22A-22C).

Each of devices 4 may include a USB connector (i.e., respectively, USB connectors 25A-25C). In some examples, one or more of USB connectors 25 may be similar to connector 24B or connector 24A of FIGS. 1-4. Each of USB connectors 25A-C may be configured to mate with a corresponding connector of second connectors 22A-22C.

As illustrated in FIG. 5, system 2 may include device 5. Device 5 may be configured to function as a hub for devices 4. In some examples, device 5 may be a USB hub. Device 5 may include a plurality of USB connectors 23A-23C (collectively, "USB connectors 23"). In some examples, one or more of USB connectors 23 may be similar to connector 24B or connector 24A of FIGS. 1-4. As illustrated in FIG. 5, each of USB connectors 23A-23C may be configured to mate with a corresponding connectors of first connectors 20A-20C. In some examples, a connector of USB connectors 23 may be configured to operate as an upstream connector. In some examples, the upstream connector may be connected, via a USB cable, to an upstream device. In some examples, one or more connectors of USB connectors 23 may be configured to operate as a downstream connector. In some examples, each of the downstream connectors may be connected, via a USB cable, to a downstream device.

In some examples, device 5 may be configured to receive power from the upstream device. In some examples, device 5 may be configured to provide power to the downstream devices. In some examples, the power provided by device 5 to the downstream devices may be sourced from the upstream device. In some examples, the power provided by device 5 to the downstream devices may be sourced from another source, such as an AC adaptor of device 5. In some examples, device 5 may be configured to supply a different amount of power to device 4B than device 4C. For instance, device 5 may supply device 4B power at a higher voltage level than device 4C.

In the example of FIG. 5, device 4A may be an upstream device and device 4B and device 4C may be downstream devices. For instance, device 4A may be a display console capable of communicating with and providing power to downstream device 4B and downstream device 4C.

In accordance with one or more techniques of this disclosure, device 4A may communicate with device 4B via ID line 14A and ID line 14B, and communicate with device 4C via ID line 14A and ID line 14C. For instance, device 4A may stream data from device 4B and device 4C. In some examples, device 4B and/or device 4C may negotiate with device 4A one or more power characteristics. For example, device 4B and/or device 4C may negotiate a voltage level and/or a current level for a Vbus line. In some examples, device 4B and/or device 4C may negotiate the power characteristics for their individual USB cables (i.e., USB cable 6B and USB cable 6C), or for the USB cable connecting the upstream device (i.e., USB cable 6A).

Figure 6:
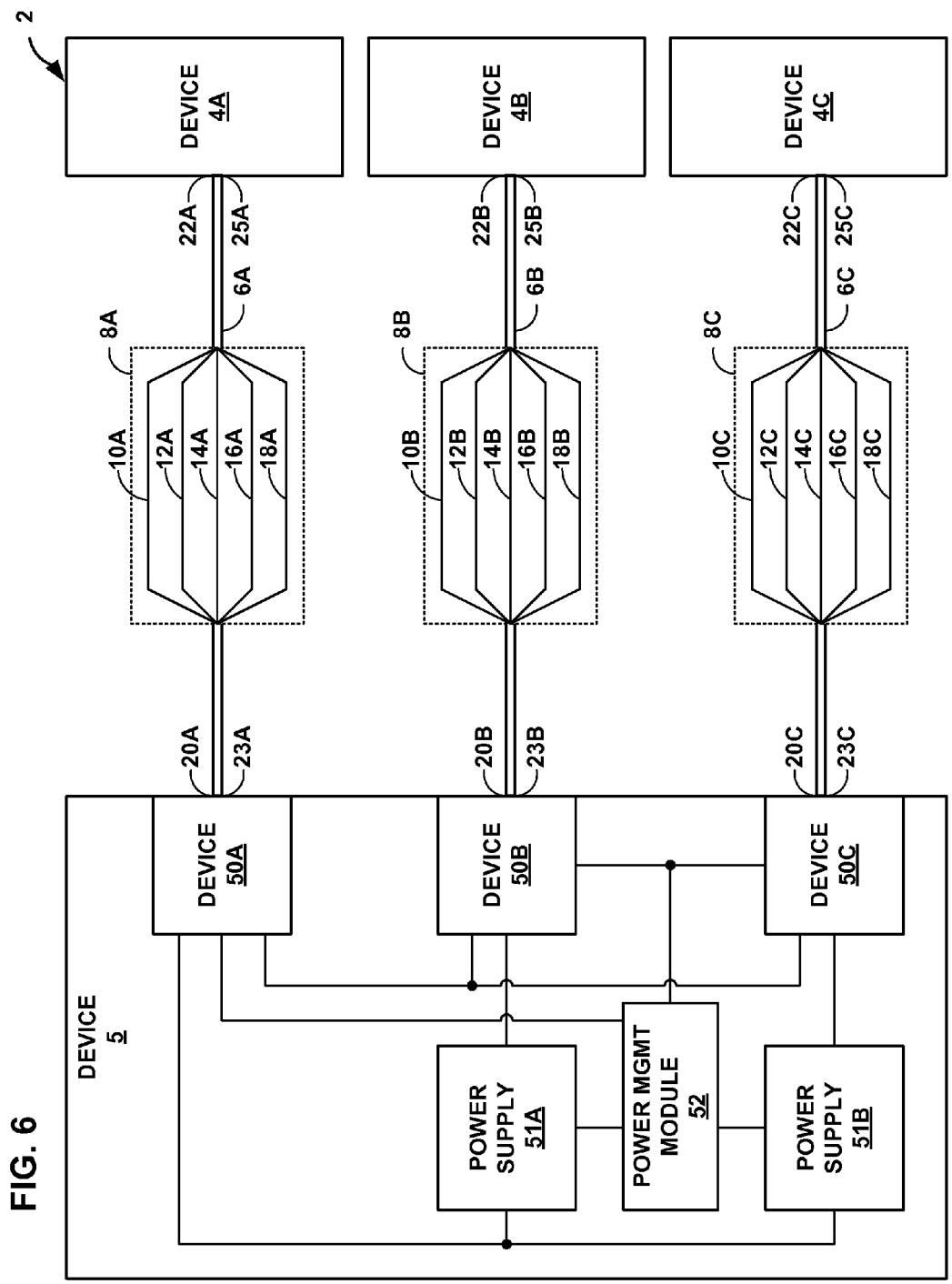
FIG. 6 is a block diagram illustrating details of an example system for inter-device communication over an identification line, in accordance with one or more aspects of the present disclosure.

FIG. 6 is a block diagram illustrating details of an example system for inter-device communication over an identification line, in accordance with one or more aspects of the present disclosure. As illustrated in FIG. 6, system 2 may include device 4A, device 4B, device 4C (collectively, "devices 4"), device 5, and USB cables 6A-6C (collectively, "USB cables 6").

As illustrated in FIG. 6, system 2 may include device 5. Device 5 may be configured to function as a hub for devices 4. In some examples, device 5 may include devices 50A-50C (collectively, "devices 50"), power supplies 51A-51B (collectively, "power supplies 51"), and power management module 52. In some examples, device 5 may also include a plurality of USB connectors 23A-23C (collectively, "USB connectors 23"). In some examples, each of USB connectors 23A-23C may be connected to a corresponding device of devices 50A-50C. For instance, USB connector 23A may be connected to device 50A.

In some examples, each of devices 50 may be configured similar to device 4A or 4B of FIGS. 1-4. For instance, each of devices 50 may be configured to communicate with another device via the ID line of a USB cable. In the example of FIG. 6, device 50A may include functionality similar to device 4B of FIGS. 1-4, and devices 50B-50C may include functionality similar to device 4A of FIGS. 1-4. In some examples, each of devices 50 may be a gateway for providing power either upstream of downstream.

Power supplies 51 may be configured to provide power. For example, power supply 51A may be configured to provide power to device 50B at a specified voltage level. In some examples, the specified voltage level may be the voltage level negotiated by device 4B. As another example, power supply 51B may be configured to provide power to device 50C at a specified voltage level. In some examples, the specified voltage level may be the voltage level negotiated by device 4C. In some examples, one or more of power supplies 51 may be similar to power supplies 56 of FIG. 3 and FIG. 4. In some examples, power supplies 51 may be included within one or more of devices 50, such as device 50A.

Power management module 51 may be configured to manage the amount of power provided by power supplies 51. For instance, power management module 51 may be configured to provide one or more of power supplies 51 with a voltage level at which the one or more of power supplies 51 should output power. In some examples, power management module 51 may be connected to devices 50 such that power management module 51 may exchange data with any of devices 50. For instance, power management module 51 may receive a voltage level and/or a current limit from any of devices 50. In some examples, power management module 51 may be configured to ensure that the total amount of power provided by power supplies 51 does not exceed the amount of power received from device 4A.

Figure 7:
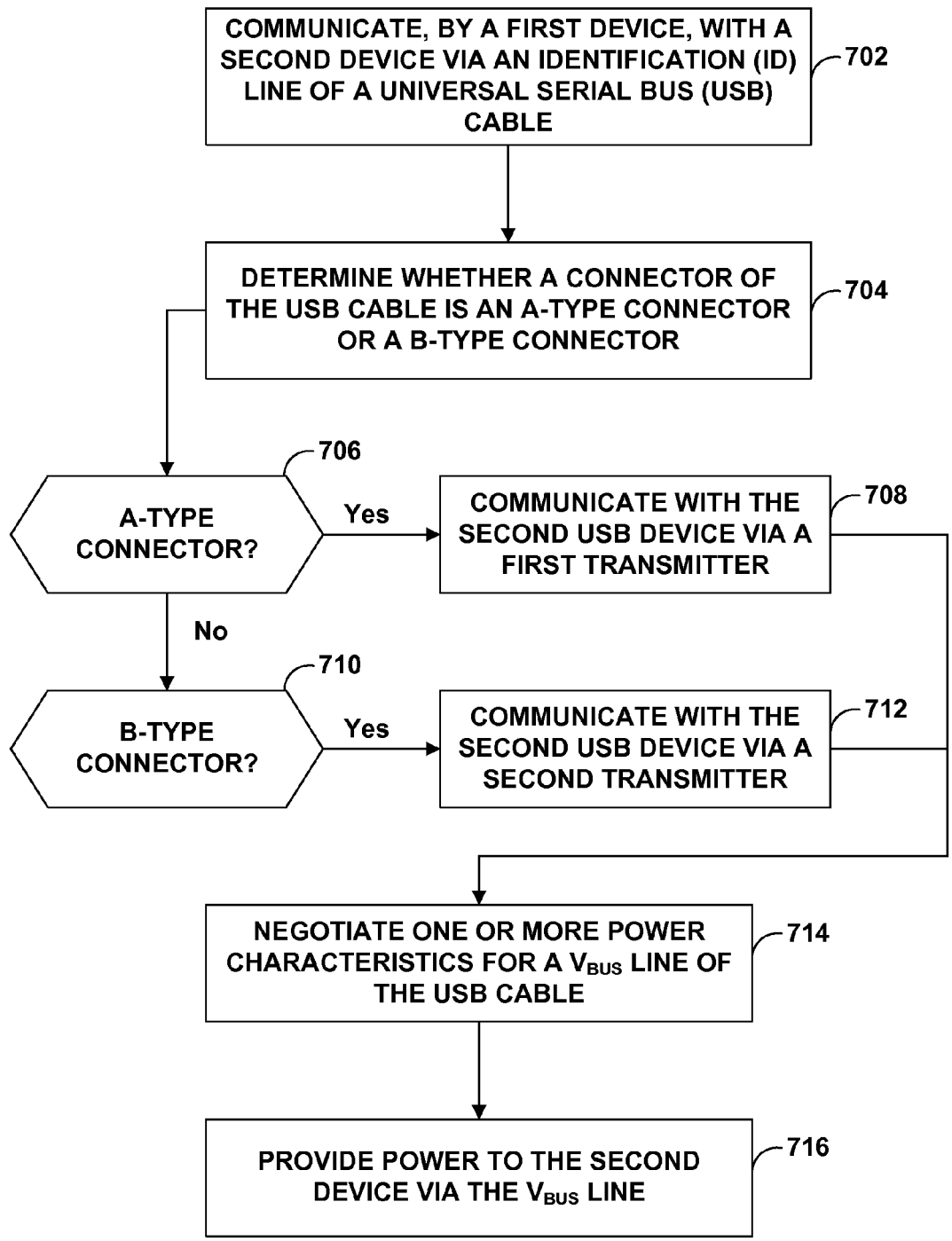
FIG. 7 is a flowchart illustrating example operations of a first device communicating with a second device over an identification line, in accordance with one or more aspects of the present disclosure.

FIG. 7 is a flowchart illustrating example operations of a first device communicating with a second device over an identification line, in accordance with one or more aspects of the present disclosure. For purposes of illustration, the techniques of FIG. 7 are described within the context of device 4A of FIG. 1, FIG. 3, and FIG. 4, although devices having configurations different than that of device 4A may perform the techniques of FIG. 7.

In accordance with one or more techniques of this disclosure, device 4A may communicate with a second device via an identification (ID) line of a universal serial bus (USB) cable (702). Device 4A may then determine whether a connector of the USB cable connected to the first device is an A-type connector of a B-type connector (704). If the connector of the USB cable is an A-type connector (706) device 4A may communicate with the second USB device via a first transmitter (708). If the connector of the USB cable is a B-type connector (710) device 4A may communicate with the second USB device via a second transmitter (712). In either case, device 4A may negotiate one or more power characteristics for a Vbus line of the USB cable (714). Device 4A may then provide power to the second USB device via the Vbus line in conformance with the negotiate power characteristics (716).

EXAMPLE 1

A device comprising: a universal serial bus (USB) connector comprising: a bus voltage ($V_{BUS}$) connector configured to mate with a $V_{BUS}$ line of a USB cable; a positive data (D+) connector configured to mate with a D+ line of the USB cable; a negative data (D−) connector configured to mate with a D− line of the USB cable; an identification (ID) connector configured to mate with a ID line of the USB cable; and a ground (GND) connector configured to mate with a GND line of the USB cable; and a communication module configured to communicate with another device via the ID line of the USB cable.

EXAMPLE 2

The device of example 1, wherein the communication module is configured to negotiate one or more power characteristics for the $V_{BUS}$ line with the other device, and wherein the one or more power characteristics for the $V_{BUS}$ line include one or more of: a voltage level for the $V_{BUS}$ line; and a current level for the $V_{BUS}$ line.

EXAMPLE 3

The device of any of examples 1-2, wherein the device is configured to provide power to the other device via the $V_{BUS}$ line, and wherein the communication module is configured to negotiate the one or more power characteristics for the $V_{BUS}$ line by at least receiving, from the other device, a request for more power.

EXAMPLE 4

The device of any of examples 1-3, further comprising: a power supply configured to provide power to the other device via the $V_{BUS}$ connector, wherein the power supply is configured to provide additional power to the other device in response to receiving a request for more power.

EXAMPLE 5

The device of any of examples 1-4, further comprising: a detection module configured to determine whether a connector of the USB cable is an A-type connector or a B-type connector.

EXAMPLE 6

The device of any of examples 1-5, further comprising: a first transmitter; and a second transmitter, wherein the communication module is configured to communicate with the other device via the first transmitter where the connector of the USB cable is an A-type connector, and wherein the communication module is configured to communicate with the other device via the second transmitter where the connector of the USB cable is a B-type connector.

EXAMPLE 7

The device of any of examples 1-6, wherein the first transmitter comprises one or more components electrically positioned between the ID connector and the GND connector, and wherein the second transmitter comprises one or more components electrically positioned between the $V_{BUS}$ connector and the ID connector

EXAMPLE 8

The device of any of examples 1-7, wherein the detection module is configured to determine that the connector of the USB cable is an A-type connector where the a voltage level of the ID connector is pulled up or where a resistance between the ID connector and the GND connector exceeds a threshold, and wherein the detection module is configured to determine that the connector of the USB cable is a B-type connector where the a voltage level of the ID connector is pulled down to a voltage level of the GND connector.

EXAMPLE 9

The device of any of examples 1-8, wherein the communication module is configured to communicate with the other USB device via the ID line in full duplex.

EXAMPLE 10

A method performed by a first device that comprises a universal serial bus (USB) connector that includes a bus voltage ($V_{BUS}$) connector configured to mate with a VBUS line of a USB cable, a positive data (D+) connector configured to mate with a D+ line of the USB cable, a negative data (D−) connector configured to mate with a D− line of the USB cable, an identification (ID) connector configured to mate with an ID line of the USB cable, and a ground (GND) connector configured to mate with a GND line of the USB cable, the method comprising: communicating, by the first device, with a second device via the ID line of the USB cable, wherein a first connector of the USB cable is attached to the USB connector of the first device, and wherein a second connector of the USB cable is attached to a USB connector of the second device.

EXAMPLE 11

The method of example 10, wherein communicating comprises: negotiating, by the first device, one or more power characteristics for the $V_{BUS}$ line of the USB cable, and wherein the one or more power characteristics for the $V_{BUS}$ line include one or more of: a voltage level for the $V_{BUS}$ line; and a current level for the $V_{BUS}$ line.

EXAMPLE 12

The method of any of examples 10-11, wherein the first device is configured to provide power to the second device via the $V_{BUS}$ line, and wherein negotiating comprises receiving, from the second device, a request for more power.

EXAMPLE 13

The method of any of examples 10-12, further comprising: in response to receiving, from the second device, a request for more power, providing additional power to the second device via the $V_{BUS}$ line.

EXAMPLE 14

The method of any of examples 10-13, further comprising: prior to providing the additional power to the second device, reducing the amount of current provided to the second device to zero.

EXAMPLE 15

The method of any of examples 10-14, wherein the first device is configured to either provider power to or receive power from the second device via the $V_{BUS}$ line, wherein communicating comprises: negotiating a transition from providing power to the second device to receiving power from the second device.

EXAMPLE 16

The method of any of examples 10-15, further comprising: determining whether the first connector of the USB cable is an A-type connector or a B-type connector.

EXAMPLE 17

The method of any of examples 10-16, further comprising: communicating, by the first device, with the second device via a first transmitter where the first connector of the USB cable is an A-type connector; and communicating, by the first device, with the second device via the second transmitter where the first connector of the USB cable is a B-type connector.

EXAMPLE 18

The method of any of examples 10-17, wherein the first transmitter comprises one or more components electrically positioned between the ID connector of the first device and the GND connector of the first device, and wherein the second transmitter comprises one or more components electrically positioned between the $V_{BUS}$ connector of the first device and the ID connector of the first device.

EXAMPLE 19

The method of any of examples 10-18, wherein determining whether the first connector of the USB cable is an A-type connector or a B-type connector comprises: determining that the first connector of the USB cable is an A-type connector where a voltage level of the ID connector is pulled up or where a resistance between the ID connector and the GND connector exceeds a threshold; and determining that the first connector of the USB cable is a B-type connector where the voltage level of the ID connector is pulled down to a voltage level of the GND connector.

EXAMPLE 20

The method of any of examples 10-19, wherein communicating, by the first device, with the second device via the ID line comprises communicating, by the first device, with the second device via the ID line in full duplex.

EXAMPLE 21

A universal serial bus (USB) cable comprising: a bus voltage ($V_{BUS}$) line; a positive data (D+) line; a negative data (D−) line; an identification (ID) line; a ground (GND) line; an A-type connector comprising: a $V_{BUS}$ connector configured to mate with a first end of the $V_{BUS}$ line; a D+ connector configured to mate with a first end of the D+ line; a D− connector configured to mate with a first end of the D− line; an ID connector configured to mate with a first end of the ID line; and a GND connector configured to mate with a first end of the GND line; a B-type connector comprising: a $V_{BUS}$ connector configured to mate with a second end of the $V_{BUS}$ line; a D+ connector configured to mate with a second end of the D+ line; a D− connector configured to mate with a second end of the D− line; an ID connector configured to mate with a second end of the ID line; and a GND connector configured to mate with a second end of the GND line; and a capacitor electrically positioned between the first ID connector and the second ID connector.

EXAMPLE 22

The USB cable of example 21, wherein the A-type connector further comprises one or more circuit elements electrically positioned between the $V_{BUS}$ connector and the ID connector, and wherein the B-type connector further comprises one or more circuit elements electrically positioned between the ID connector and the GND connector.

EXAMPLE 23

A system comprising: a universal serial bus (USB) cable comprising: a bus voltage ($V_{BUS}$) line; a positive data (D+) line; a negative data (D−) line; an identification (ID) line; a ground (GND) line; a first connector comprising: a first $V_{BUS}$ connector connected to a first end of the $V_{BUS}$ line; a first D+ connector connected to the first end of the D+ line; a first D− connector connected to the first end of the D− line; a first ID connector connected to the first end of the ID line; and a first GND connector connected to the first end of the GND; a second connector comprising: a second $V_{BUS}$ connector connected to a second end of the $V_{BUS}$ line; a second D+ connector connected to the second end of the D+ line; a second D− connector connected to the second end of the D− line; a second ID connector connected to the second end of the ID line; and a second GND connector connected to the second end of the GND; and a capacitor electrically positioned between the first ID connector and the second ID connector; a first device comprising: a USB connector comprising: a $V_{BUS}$ connector configured to mate with the first $V_{BUS}$ connector of the USB cable; a D+ connector configured to mate with the first D+ connector of the USB cable; a D− connector configured to mate with the first D− connector of the USB cable; a ID connector configured to mate with the first ID connector of the USB cable; and a GND connector configured to mate with the first GND connector of the USB cable; and a communication module; and a second device comprising: a USB connector comprising: a $V_{BUS}$ connector configured to mate with the second $V_{BUS}$ connector of the USB cable; a D+ connector configured to mate with the second D+ connector of the USB cable; a D− connector configured to mate with the second D− connector of the USB cable; a ID connector configured to mate with the second ID connector of the USB cable; and a GND connector configured to mate with the second GND connector of the USB cable; and a second communication module, wherein the first communication module and the second communication module are configured to communicate with each other by exchanging data over the ID line of the USB cable.

EXAMPLE 24

The system of example 23, wherein the first device is a power consumer, wherein the second device is a power provider, wherein the first communication module is configured to negotiate one or more power characteristics for the $V_{BUS}$ line with the second communication module, and wherein the one or more power characteristics for the $V_{BUS}$ line include one or more of: a voltage level for the $V_{BUS}$ line; and a current level for the $V_{BUS}$ line.

EXAMPLE 25

A non-transitory computer-readable storage medium storing instructions that, when executed, cause one or more processors of a device to perform the operations of any combination of examples 10-20.

Various examples have been described. These and other examples are within the scope of the following claims.

The invention claimed is:
1. A device comprising:
a universal serial bus (USB) connector comprising:
a bus voltage ($V_{BUS}$) connector configured to mate with a $V_{BUS}$ line of a USB cable;
a positive data (D+) connector configured to mate with a D+ line of the USB cable;
a negative data (D−) connector configured to mate with a D− line of the USB cable;
an identification (ID) connector configured to mate with a ID line of the USB cable; and
a ground (GND) connector configured to mate with a GND line of the USB cable; and
a communication module configured to communicate with another device via the ID line of the USB cable, wherein the communication module is configured to negotiate one or more power characteristics for the $V_{BUS}$ line with the other device, and wherein the one or more power characteristics for the $V_{BUS}$ line include one or more of:
a voltage level for the $V_{BUS}$ line; and
a current level for the $V_{BUS}$ line.
2. The device of claim 1, wherein the device is configured to provide power to the other device via the $V_{BUS}$ line, and wherein the communication module is configured to negotiate the one or more power characteristics for the $V_{BUS}$ line by at least receiving, from the other device, a request for more power.

3. The device of claim 2, further comprising:
a power supply configured to provide power to the other device via the V$_{BUS}$ connector, wherein the power supply is configured to provide additional power to the other device in response to receiving a request for more power.

4. The device of claim 1, further comprising:
a detection module configured to determine whether a connector of the USB cable is an A-type connector or a B-type connector.

5. The device of claim 4, further comprising:
a first transmitter; and
a second transmitter,
wherein the communication module is configured to communicate with the other device via the first transmitter where the connector of the USB cable is an A-type connector, and wherein the communication module is configured to communicate with the other device via the second transmitter where the connector of the USB cable is a B-type connector.

6. The device of claim 5, wherein the first transmitter comprises one or more components electrically positioned between the ID connector and the GND connector, and wherein the second transmitter comprises one or more components electrically positioned between the V$_{BUS}$ connector and the ID connector.

7. The device of claim 4, wherein the detection module is configured to determine that the connector of the USB cable is an A-type connector where a voltage level of the ID connector is pulled up or where a resistance between the ID connector and the GND connector exceeds a threshold, and wherein the detection module is configured to determine that the connector of the USB cable is a B-type connector where the a voltage level of the ID connector is pulled down to a voltage level of the GND connector.

8. The device of claim 1, wherein the communication module is configured to communicate with the other USB device via the ID line in full duplex.

9. A method performed by a first device that comprises a universal serial bus (USB) connector that includes a bus voltage (V$_{BUS}$) connector configured to mate with a VBUS line of a USB cable, a positive data (D+) connector configured to mate with a D+ line of the USB cable, a negative data (D−) connector configured to mate with a D− line of the USB cable, an identification (ID) connector configured to mate with an ID line of the USB cable, and a ground (GND) connector configured to mate with a GND line of the USB cable, the method comprising:
communicating, by the first device, with a second device via the ID line of the USB cable, wherein a first connector of the USB cable is attached to the USB connector of the first device, wherein a second connector of the USB cable is attached to a USB connector of the second device, wherein communicating comprises:
negotiating, by the first device, one or more power characteristics for the V$_{BUS}$ line of the USB cable, and wherein the one or more power characteristics for the V$_{BUS}$ line include one or more of:
a voltage level for the V$_{BUS}$ line; and
a current level for the V$_{BUS}$ line.

10. The method of claim 9, wherein the first device is configured to provide power to the second device via the V$_{BUS}$ line, and wherein negotiating comprises receiving, from the second device, a request for more power.

11. The method of claim 10, further comprising:
in response to receiving, from the second device, a request for more power, providing additional power to the second device via the V$_{BUS}$ line.

12. The method of claim 11, further comprising:
prior to providing the additional power to the second device, reducing the amount of current provided to the second device to zero.

13. The method of claim 11, wherein the first device is configured to either provider power to or receive power from the second device via the V$_{BUS}$ line, wherein communicating comprises:
negotiating a transition from providing power to the second device to receiving power from the second device.

14. The method of claim 9, further comprising:
determining whether the first connector of the USB cable is an A-type connector or a B-type connector.

15. The method of claim 14, further comprising:
communicating, by the first device, with the second device via a first transmitter where the first connector of the USB cable is an A-type connector; and
communicating, by the first device, with the second device via the second transmitter where the first connector of the USB cable is a B-type connector.

16. The method of claim 15, wherein the first transmitter comprises one or more components electrically positioned between the ID connector of the first device and the GND connector of the first device, and wherein the second transmitter comprises one or more components electrically positioned between the V$_{BUS}$ connector of the first device and the ID connector of the first device.

17. The method of claim 14, wherein determining whether the first connector of the USB cable is an A-type connector or a B-type connector comprises:
determining that the first connector of the USB cable is an A-type connector where a voltage level of the ID connector is pulled up or where a resistance between the ID connector and the GND connector exceeds a threshold; and
determining that the first connector of the USB cable is a B-type connector where the voltage level of the ID connector is pulled down to a voltage level of the GND connector.

18. The method of claim 9, wherein communicating, by the first device, with the second device via the ID line comprises communicating, by the first device, with the second device via the ID line in full duplex.

19. A system comprising:
a universal serial bus (USB) cable comprising:
a bus voltage (V$_{BUS}$) line;
a positive data (D+) line;
a negative data (D−) line;
an identification (ID) line;
a ground (GND) line;
a first connector comprising:
a first V$_{BUS}$ connector connected to a first end of the V$_{BUS}$ line;
a first D+ connector connected to the first end of the D+ line;
a first D− connector connected to the first end of the D− line;
a first ID connector connected to the first end of the ID line; and
a first GND connector connected to the first end of the GND;

a second connector comprising:
    a second V$_{BUS}$ connector connected to a second end of the V$_{BUS}$ line;
    a second D+ connector connected to the second end of the D+ line;
    a second D− connector connected to the second end of the D− line;
    a second ID connector connected to the second end of the ID line; and
    a second GND connector connected to the second end of the GND; and
  a capacitor electrically positioned between the first ID connector and the second ID connector;
a first device comprising:
  a USB connector comprising:
    a V$_{BUS}$ connector configured to mate with the first V$_{BUS}$ connector of the USB cable;
    a D+ connector configured to mate with the first D+ connector of the USB cable;
    a D− connector configured to mate with the first D− connector of the USB cable;
    a ID connector configured to mate with the first ID connector of the USB cable; and
    a GND connector configured to mate with the first GND connector of the USB cable; and
  a communication module; and
a second device comprising:
  a USB connector comprising:
    a V$_{BUS}$ connector configured to mate with the second V$_{BUS}$ connector of the USB cable;
    a D+ connector configured to mate with the second D+ connector of the USB cable;
    a D− connector configured to mate with the second D− connector of the USB cable;
    a ID connector configured to mate with the second ID connector of the USB cable; and
    a GND connector configured to mate with the second GND connector of the USB cable; and
  a second communication module,
wherein the first communication module and the second communication module are configured to communicate with each other by exchanging data over the ID line of the USB cable, wherein the first device is a power consumer, wherein the second device is a power provider, wherein the first communication module is configured to negotiate one or more power characteristics for the V$_{BUS}$ line with the second communication module, and wherein the one or more power characteristics for the V$_{BUS}$ line include one or more of:
a voltage level for the V$_{BUS}$ line; and
a current level for the V$_{BUS}$ line.

* * * * *